(12) United States Patent
Huotari et al.

(10) Patent No.: US 7,813,717 B2
(45) Date of Patent: Oct. 12, 2010

(54) AUTHENTICATION OF MOBILE STATIONS

(75) Inventors: Allen J. Huotari, Garden Grove, CA (US); Manrique Brenes, Corona Del Mar, CA (US)

(73) Assignee: Cisco Technology, Inc., San Jose, CA (US)

( * ) Notice: Subject to any disclaimer, the term of this patent is extended or adjusted under 35 U.S.C. 154(b) by 1552 days.

(21) Appl. No.: 11/128,895

(22) Filed: May 13, 2005

(65) Prior Publication Data

US 2006/0281457 A1 Dec. 14, 2006

(51) Int. Cl.
*H04M 1/66* (2006.01)

(52) U.S. Cl. .................. 455/411; 455/435.1; 455/556.1; 455/456.6

(58) Field of Classification Search .................. 455/411, 455/410, 435.1, 435.2, 435.3, 550.1, 556.1, 455/556.2, 558, 575.1, 575.3, 456.6; 370/352, 370/401

See application file for complete search history.

(56) References Cited

U.S. PATENT DOCUMENTS

| | | | |
|---|---|---|---|
| 2002/0147008 A1* | 10/2002 | Kallio ........................ 455/426 |
| 2003/0051041 A1* | 3/2003 | Kalavade et al. ............ 709/229 |
| 2004/0076120 A1* | 4/2004 | Ishidoshiro ................. 370/252 |
| 2005/0233729 A1* | 10/2005 | Stojanovski et al. ........ 455/411 |
| 2006/0013170 A1* | 1/2006 | Shin et al. ................... 370/338 |
| 2006/0120351 A1* | 6/2006 | Rajagopalan ............... 370/352 |
| 2006/0194569 A1* | 8/2006 | Hsueh ...................... 455/412.1 |

* cited by examiner

*Primary Examiner*—Melur Ramakrishnaiah
(74) *Attorney, Agent, or Firm*—Haynes and Boone, LLP

(57) ABSTRACT

A method and system for authenticating a mobile station, such as a dual mode cellular telephone, for access to a wireless local area network is disclosed. The mobile station can be authenticated by registering, and thus pre-authenticating, it with the wireless area network. Registration can comprise providing identifying information regarding the mobile station to the local area network. Access to the local area network facilitates the use of the local area network for communications by the mobile station, such as using VoIP over the Internet.

17 Claims, 5 Drawing Sheets

AUTHENTICATION OF MOBILE STATIONS

TECHNICAL FIELD

The present invention relates generally to wireless networking. The present invention relates more particularly to the pre-authentication of mobile stations via registration with a network, such as a small office/home office network.

BACKGROUND

Cellular telephones are well known. The pervasive use of cellular telephones has stimulated development into innovative new ways to increase the convenience and decrease the cost associated with their use. One example of such an innovation is the development of dual mode handsets. Dual mode handsets are cellular telephones that can be used both with a cellular telephone system and with a wireless local area network (LAN).

As voice over IP (VoIP) matures, there is a financial motivation to tie cellular telephones into wireless LANs, i.e., to provide wireless/cellular convergence. VoIP is substantially cheaper than traditional cellular communications. It is expected that dual mode handsets will have a substantial share of the cellular telephone market within a few years. Indeed, ABI Research has predicted that by 2009, there will be over 50 million dual mode handsets in operation, accounting for seven percent of the handsets shipped that year.

Dual mode handsets allow a user to take advantage of residential gateways and access points to check email, surf the Internet, access enterprise networks, and place telephone calls. Thus, wireless LANs, such as WiFi compliant 802.11 networks, permit dual mode handset users to bypass the traditional cellular network by using the Internet to route telephone calls instead. This has the potential to result in substantial cost savings for both individuals and companies.

Access points are already common in homes, business offices, cafes, bookstores, and airports. As access points become more widespread, the advantages of such dual mode operation become even more apparent.

Cellular networks implement security procedures that provide adequately secure communications for normal personal and business use. These security procedures include airlink authentication and encryption, as well as subscriber authentication and service authorization.

When a handset is augmented to support IEEE 802.11, similar security procedures must be implemented. However, establishing wireless LAN security parameters between an unlicensed mobile access mobile station (UMA MS), e.g., a handset, and an access point is out of scope for the current revision of the unlicensed mobile access specification.

Thus, it would be beneficial to provide a method and system whereby an unlicensed mobile access mobile station or other dual mode device can be registered with a wireless LAN before connecting thereto, such that the device is pre-authenticated. Thus, the device can legitimately receive security parameters of the wireless LAN when the device later associates therewith.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION OF THE PREFERRED EMBODIMENTS

A method and system for pre-authenticating mobile stations is disclosed. Mobile stations, as the term is used herein, can include unlicensed mobile access mobile stations (UMA MS). These can be dual mode devices that are configured to communicate both to a cellular telephone network and to a wireless local area network (LAN), such as an IEEE 802.11 wireless network. Examples of such dual mode devices can include cellular telephones, personal digital assistants (PDAs), notebook computers, and laptop computers.

Figure 1:
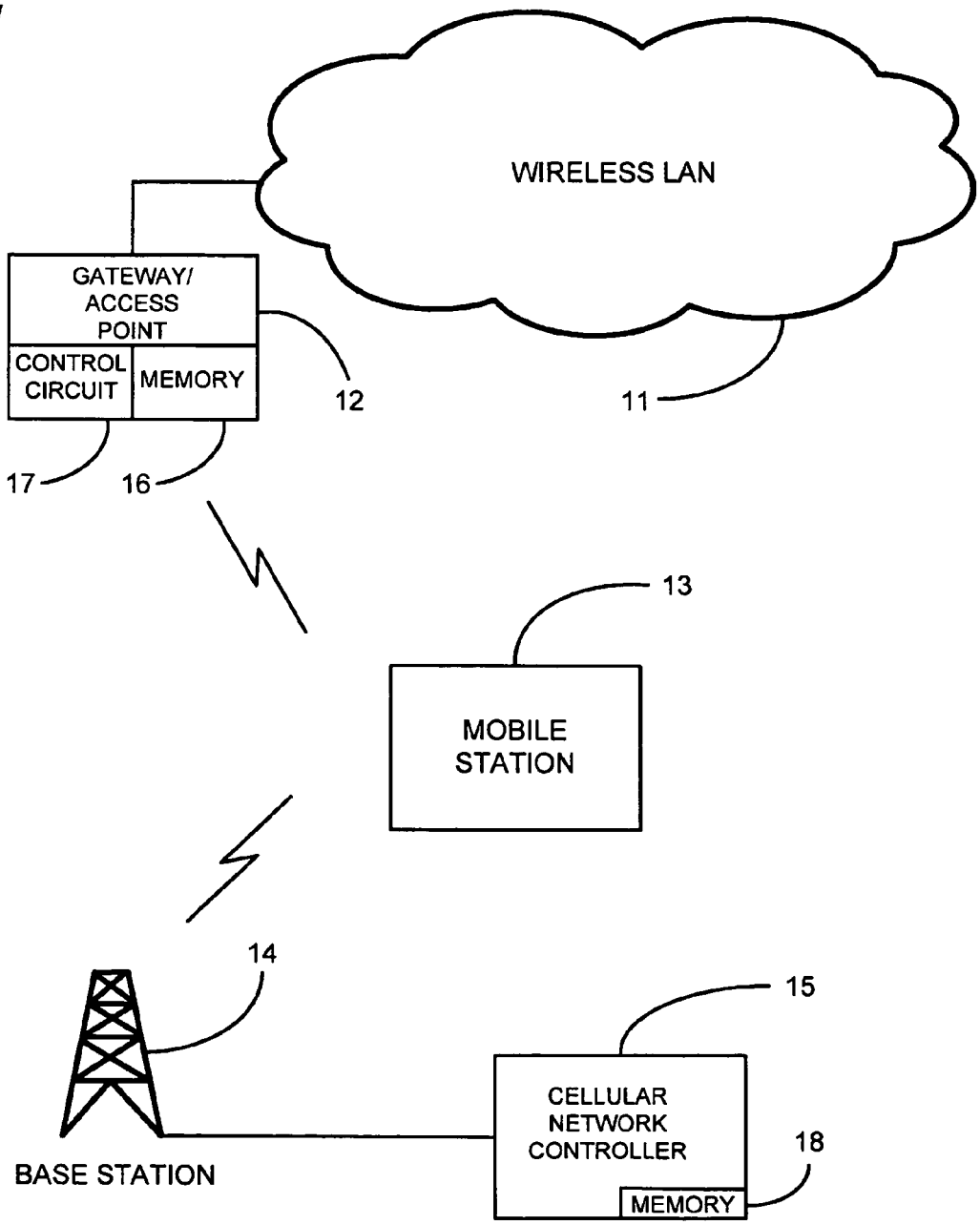
FIG. 1 is a block diagram showing a mobile station, e.g., a dual mode a telephone handset, in communication with a base station and a gateway/access point according to an exemplary embodiment of the present invention.

Referring now to FIG. 1, a wireless local area network (LAN) 11 is in communication with a gateway/access point, simply referred to herein as an access point 12. Wireless local area network 11 can be in communication with a wide area network, such as the Internet. Access point 12 can be in communication with a mobile station 13. As discussed above, it is sometimes advantageous, such as with respect to costs, for a mobile station such as a dual mode cellular telephone to communicate via a network, such as the Internet, using a protocol such as VoIP.

Mobiles station 13 can also be in communication with a cellular telephone network base station 14. Base station 14 is in communication with a cellular network controller 15. Thus, in those instances when mobile station 13 is not within the range of an access point with which it is allowed to associate, such as access point 12, then mobile station 13 must communicate via the cellular telephone network using a base station, such as base station 14. However, in those instances when mobile station is within range of an access point with which it is allowed to associate, then mobile station 13 can optionally communicate via a network, typically a wide area network such as the Internet, with which access point 12 facilitates communication.

As discussed above, some method for determining that mobile station 13 is authorized to communicate via access point 12 is generally needed before substantive (non-handshaking/housekeeping) communications therebetween take place. For example, such determination can be required for access control and billing purposes.

According to one aspect of the present invention, mobile station 13 can be registered with wireless LAN 11 so as to facilitate pre-authentication. That is, information regarding mobile station 13 can provided to wireless LAN 11 prior to an attempt by mobile station 13 to communicate with access point 12. For example, information uniquely identifying mobile station 13 can be provided to wireless LAN 11 before mobile station 13 attempts to associate to wireless LAN 11, so that wireless LAN 11 can use this information to determine if mobile station 13 is authorized to communicate with wireless LAN 11. According to one aspect of the present invention, this information is stored in access point 12. However, the information may alternatively be stored elsewhere on wireless LAN 11.

Various different methods can be used according to different embodiments of the present invention to provide such registration and pre-authentication. Four examples of such methods are discussed below.

Method 1—Out of Band with Remote Database

Figure 2:
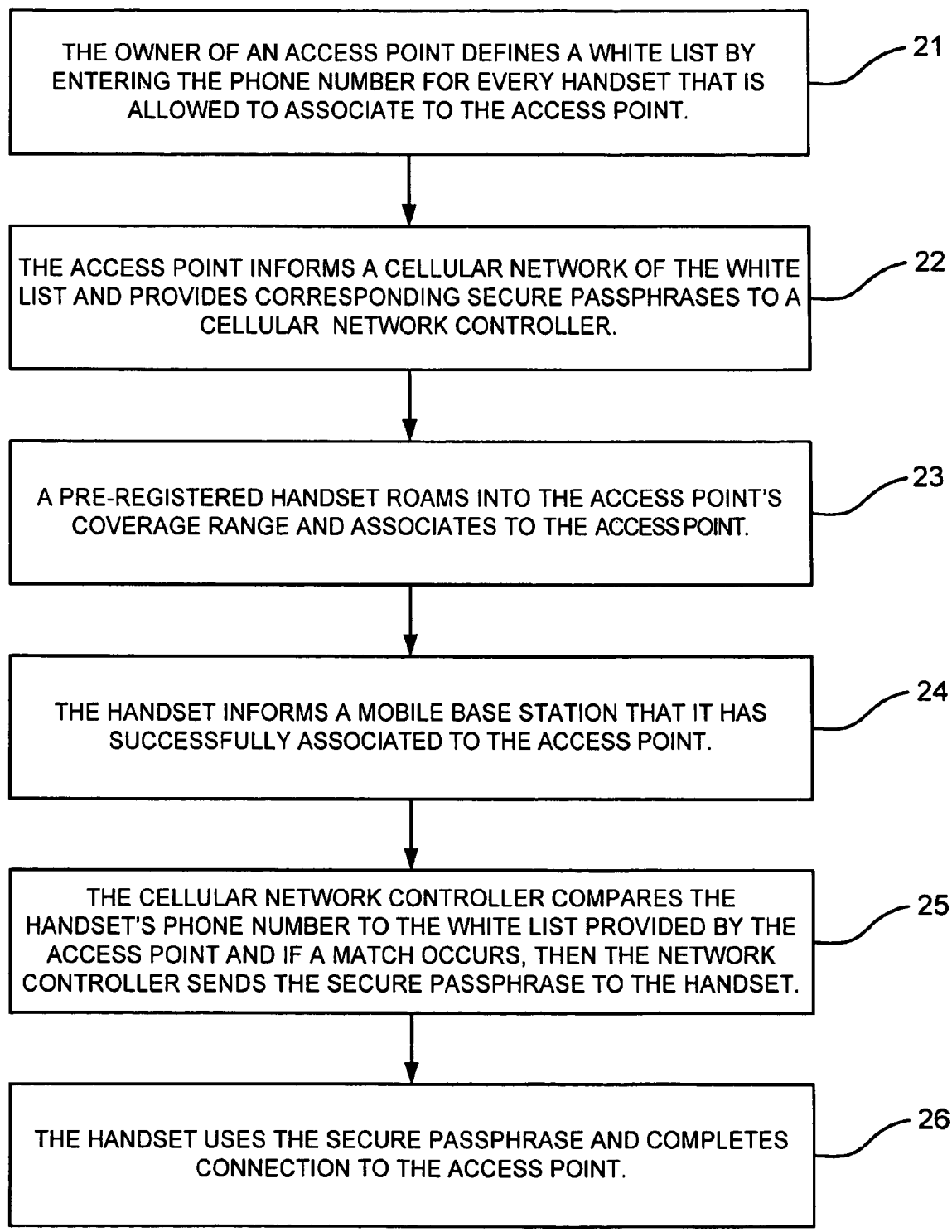
FIG. 2 is a flow chart showing a method for pre-authentication of a mobile station, according to an exemplary embodiment of the present invention.

Referring now to FIG. 2, the owner or administrator of access point 12 (FIG. 1) enters the phone number (or other relevant identifier) for every mobile station 13, e.g., cellular telephone handset, that is allowed to associate to the access point, as shown in block 21. This is a registration or pre-authentication process for mobile station 13 with respect to the wireless LAN 11. This process authenticates mobile station 13 before it has associated to the access point 12. Furthermore, this process results in the creation of a white list of authorized mobile devices 13 and corresponding secure passphrases.

Access point 12 provides the white list and the corresponding secure passphrases to cellular network controller 15, as indicated in block 22. Thus, a remote database of white lists and passphrases is formed.

Subsequent to the registration process described above, registered and pre-authorized mobile station 13 roams into the coverage range of access point 12 and associates to the access point 12, as indicated in block 23. Mobile station 13 then informs the base station 14 that it has successfully associated to access point 12, as indicated in block 24.

Cellular network controller 15 compares the phone number of the mobile station 13 to the white list provided by access point 12. If a match occurs, cellular network controller 15 sends the secure passphrase to mobile station 13 via the cellular network, as indicated in block 25. Mobile station 13 uses the secure passphrase and completes connection to access point 12, as indicated in block 26.

Method 2—In Band with Remote Database

Figure 3:
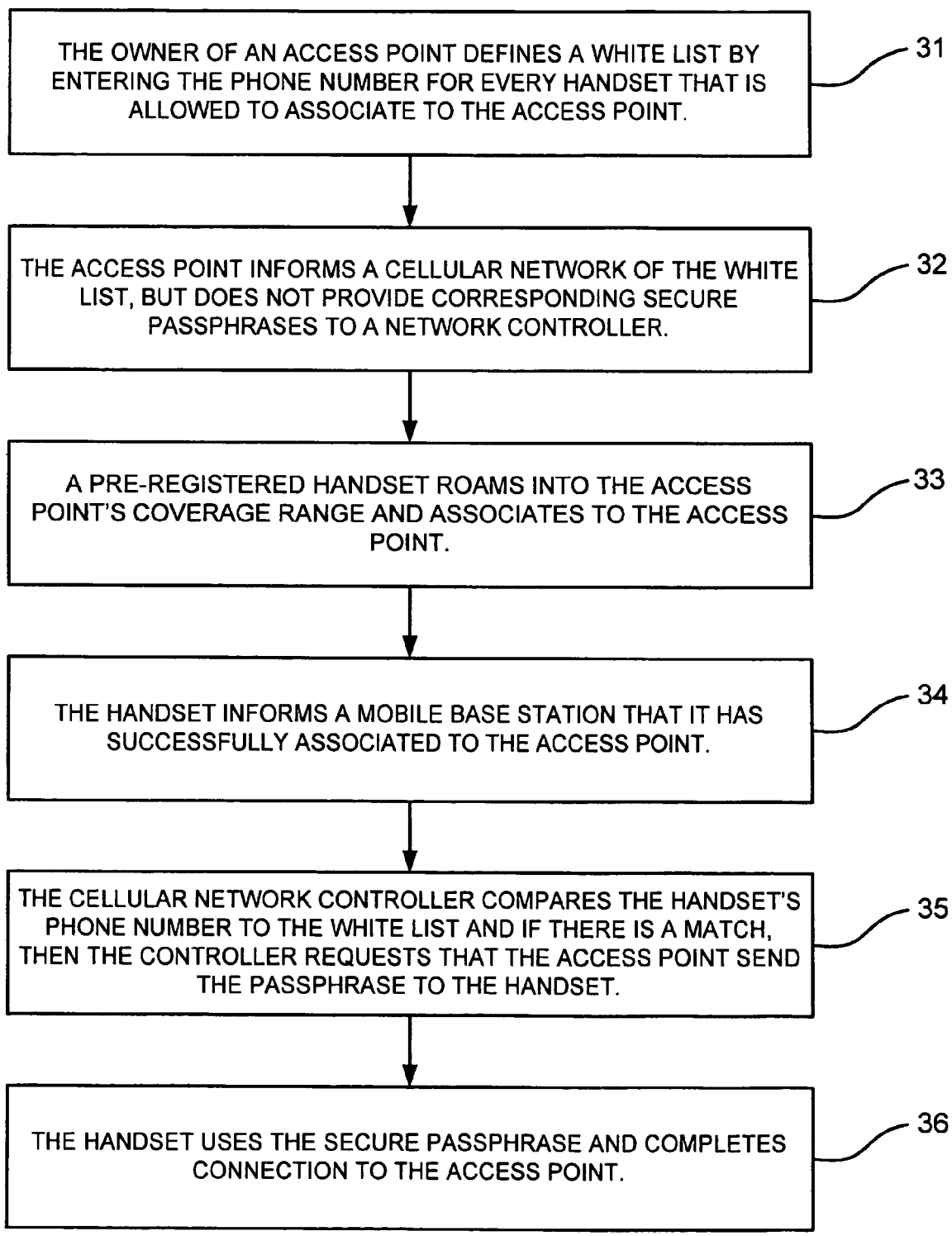
FIG. 3 is a flow chart showing another method for pre-authentication of a mobile station, according to an exemplary embodiment of the present invention.

Referring now to FIG. 3, the owner or administrator of access point 12 (FIG. 1) enters the phone number (or other relevant identifier) for every mobile station 13, e.g., cellular telephone handset, that is allowed to associate to the access point, as shown in block 31. This is a registration or pre-authentication process for mobile station 13 with respect to the wireless LAN 11. This process authenticates mobile station 13 before it has associated to the access point 12. Furthermore, this process results in the creation of a white list of authorized mobile devices 13 and corresponding secure passphrases.

Access point 12 communicates the white list, but not the secure passphrases, to cellular network controller 15, as indicated in block 32. This forms a database of white lists only.

Subsequent to the registration process described above, registered and pre-authorized mobile station 13 roams into the coverage range of access point 12 and associates to the access point 12, as indicated in block 33. Mobile station 13 informs the base station 14 that it has successfully associated to the access point 12, as indicated in block 34.

The cellular network controller compares the phone number of mobile station 13 to the white list provided by access point 12. If a match occurs, the controller informs access point 12 to send the secure passphrase to mobile station 13 via wireless LAN 11, as indicated in block 35. Mobile station 13 then uses the secure passphrase and completes connection to access point 12, as indicated in block 36.

Method 3—Out of Band with Local Database

Figure 4:
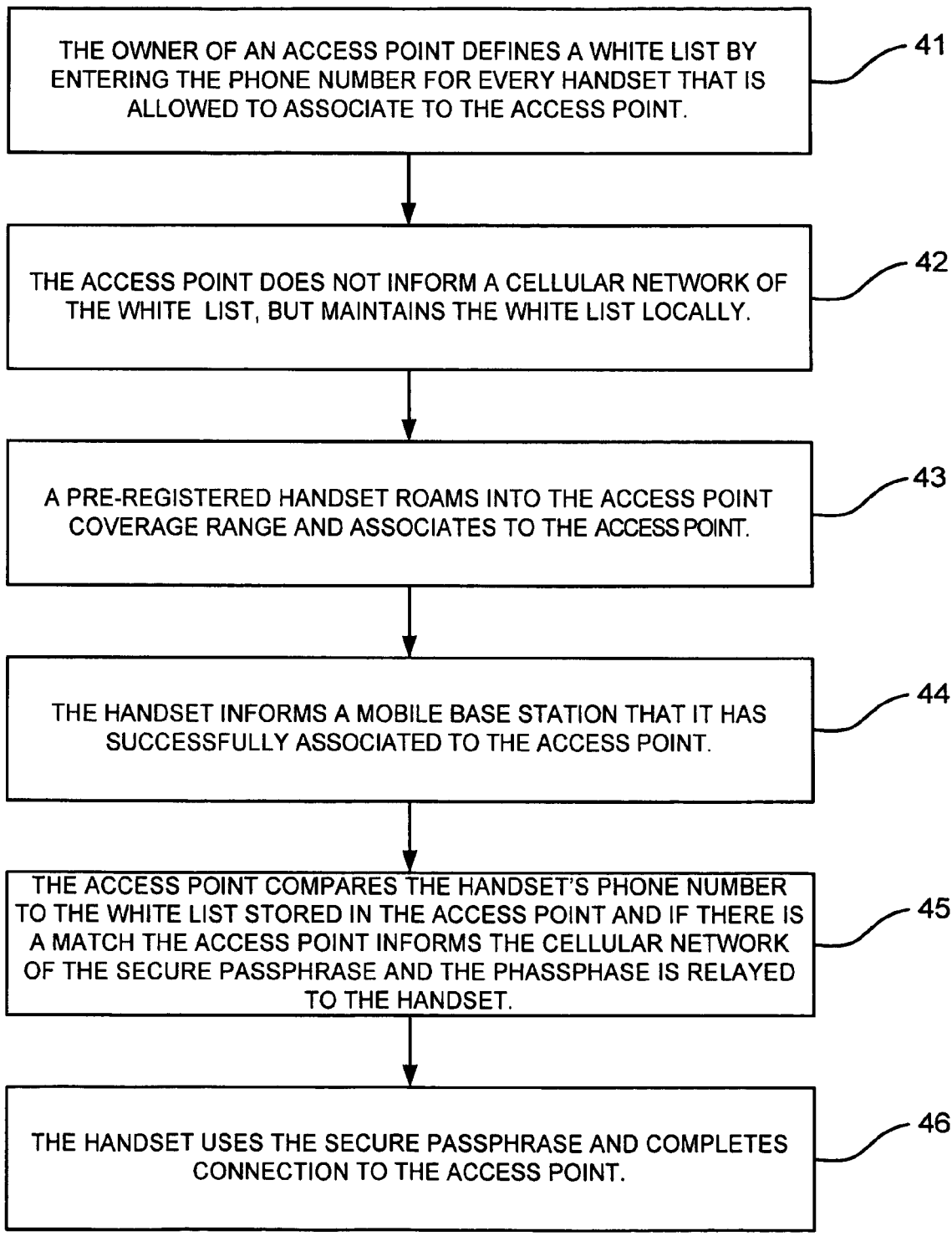
FIG. 4 is a flow chart showing another method for pre-authentication of a mobile station, according to an exemplary embodiment of the present invention.

Referring now to FIG. 4, the owner or administrator of access point 12 (FIG. 1) enters the phone number (or other relevant identifier) for every mobile station 13, e.g., cellular telephone handset, that is allowed to associate to the access point, as shown in block 41. This is a registration or pre-authentication process for mobile station 13 with respect to the wireless LAN 11. This process authenticates mobile station 13 before it has associated to the access point 12. Furthermore, this process results in the creation of a white list of authorized mobile devices 13 and corresponding secure passphrases.

Access point 12 does not provide the cellular network with either the white list or the secure passphrases, but maintains this information locally, as indicated in block 42. The white list and corresponding secure passphrases thus define a local database.

Subsequent to the registration process described above, registered and pre-authorized mobile station 13 roams into the coverage range of access point 12 and associates to the access point 12, as indicated in block 43. Mobile station 13 informs the base station 14 that it has successfully associated to access point 12, as indicated in block 44.

Access point 12 compares the phone number or other identifier of mobile station 13 to the white list stored in access point 12. If a match occurs, access point 13 informs cellular network controller 15 of the secure passphrase to be relayed to the mobile station 13, as indicated in block 45. The controller sends the secure passphrase to the mobile station 13 via the cellular network. Mobile station 13 then uses the secure passphrase and completes connection to access point 13, as indicated in block 15, as indicated in block 46.

Method 4—In Band with Local Database

Figure 5:
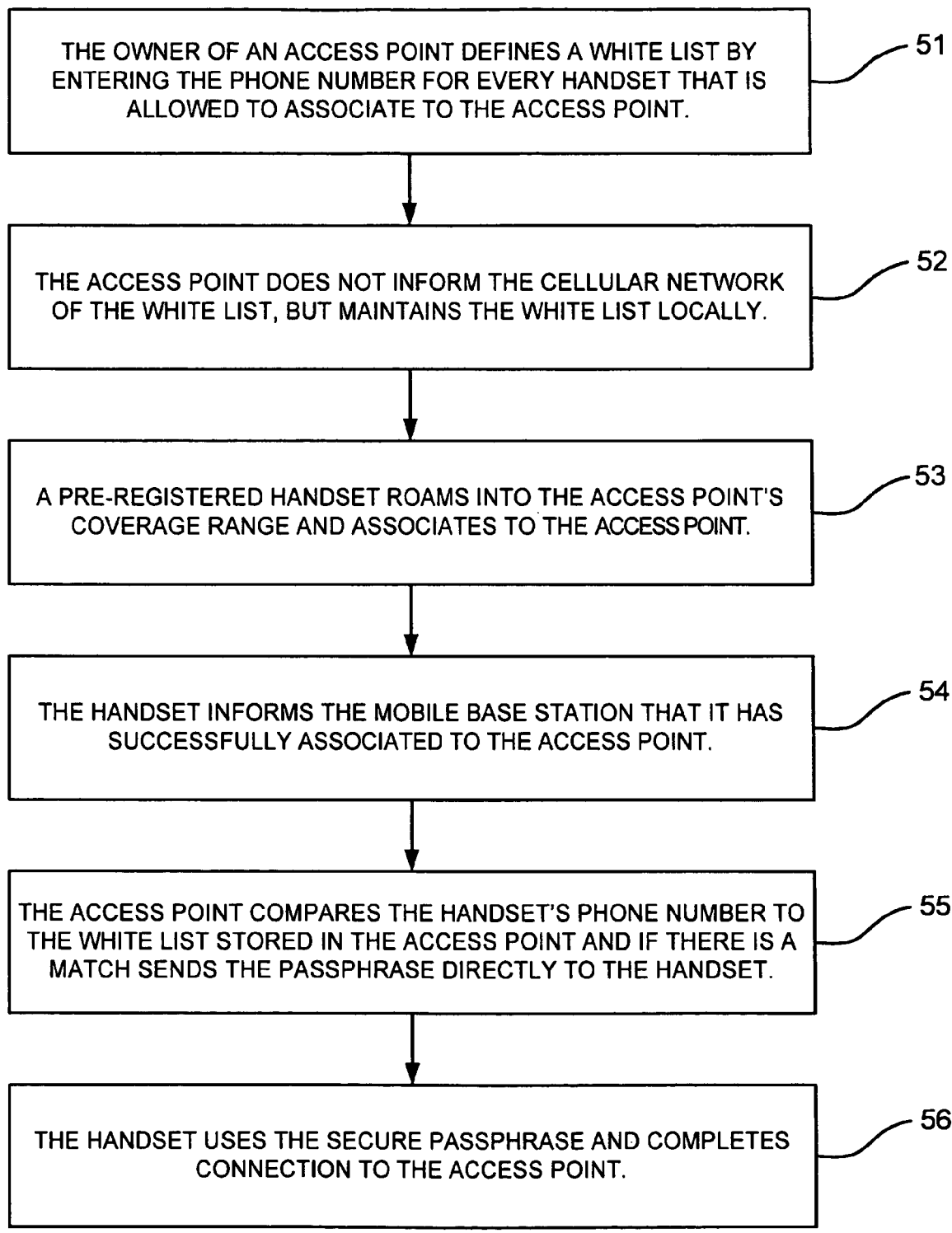
FIG. 5 is a flow chart showing another method for pre-authentication of a mobile station, according to an exemplary embodiment of the present invention.

Referring now to FIG. 5, the owner or administrator of access point 12 (FIG. 1) enters the phone number (or other relevant identifier) for every mobile station 13, e.g., cellular telephone handset, that is allowed to associate to the access point, as shown in block 51. This is a registration or pre-authentication process for mobile station 13 with respect to the wireless LAN 11. This process authenticates mobile station 13 before it has associated to the access point 12. Furthermore, this process results in the creation of a white list of authorized mobile devices 13 and corresponding secure passphrases.

Access point 11 does not provide the cellular network with the white list or secure passphrases, but maintains the white list and secure passphrases locally, as indicated in block 52. The white list and secure passphrases thus define a local database.

Subsequent to the registration process described above, registered and pre-authorized mobile station 13 roams into the coverage range of access point 12 and associates to the access point 12, as indicated in block 53. Mobile station 13 optionally informs the base station 14 that it has successfully associated to access point 12, as indicated in block 54.

Access point 12 compares the phone number or other identifier of mobile station 13 to the white list stored in access point 12. If a match occurs, the access point 12 sends the secure passphrase directly to mobile station 13 over wireless LAN 11, as indicated in block 55. Mobile station 13 then uses the secure passphrase and completes connection to the access point 12, as indicated in block 56.

According to one or more embodiments of the present invention, wireless access point vendors (including devices that embed access points) can authenticate mobile stations that are permitted to use the wireless service of the host venue.

This can occur by either manually or automatically registering the mobile station with the access point(s) at the venue of a mobile station vendor. Access point vendors can configure their access points so as to be easily identified and thus facilitate admission to a secure wireless LAN. Mobile stations that have membership rights to a home network/small office network or the like can easily obtain the wireless LAN security parameters via a registration and pre-authentication process.

As used herein, the term passphrase includes passphrases, passwords, keys, and any other information that can be used to facilitate authentication of a mobile station for association to a wireless LAN.

The present invention can be used in a variety of applications, including registering of a mobile station with a wireless local area network of a WiFi hot spot or a wireless local area network of an enterprise office environment.

One or more embodiments of the present invention provide a method and system whereby an unlicensed mobile access mobile station or other dual mode device can be registered with a wireless LAN before connection thereto, such that the device is pre-authenticated. Thus, the device can legitimately receive security parameters of the wireless LAN when the device later associates therewith.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A method for authenticating a mobile station for access to a wireless local area network, the method comprising:
   receiving a registration for a mobile station prior to receiving an association request from the mobile station;
   storing identification information for a plurality of mobile stations that are to be allowed to associate to the wireless local area network so as to create a white list of authorized mobile stations;
   communicating the white list and corresponding passphrases to a network controller of a cellular telephone network;
   associating a mobile station that has roamed into a coverage area of the wireless local area network to the wireless local area network; and
   receiving from the mobile station a passphrase and using the passphrase to complete connection to the wireless local area network, the passphrase having been communicated from a cellular network controller to the mobile station.

2. A method for authenticating a mobile station for access to a wireless local area network, the method comprising:
   receiving a registration for a mobile station prior to receiving an association request from the mobile station;
   storing identification information for a plurality of mobile stations that are to be allowed to associate to the wireless local area network so as to create a white list of authorized mobile stations;
   communicating the white list to a network controller of a cellular network and not communicating corresponding passphrases to the network controller;
   associating a mobile station that has roamed into a coverage area of the wireless local area network to the wireless local area network;
   receiving instructions form a cellular network controller to communicate a passphrase for the mobile station from the wireless local area network to the mobile station;
   communicating the passphrase from the wireless local area network to the mobile station via the wireless local area network; and
   receiving from the mobile station the passphrase and using the passphrase to complete connection to the wireless local area network.

3. A method for authenticating a mobile station for access to a wireless local area network, the method comprising:
   receiving a registration for a mobile station prior to receiving an association request from the mobile station;
   storing identification information for a plurality of mobile stations that are to be allowed to associate to the wireless local area network so as to create a white list of authorized mobile stations;
   storing the white list locally on the wireless local area network;
   associating a mobile station that has roamed into a coverage area of the wireless local area network to the wireless local area network;
   comparing identification information of the mobile station to the white list and when a match occurs, communicating a passphrase from the wireless local area network to the mobile station via the cellular telephone network; and
   receiving from the mobile station the passphrase and using the passphrase to complete connection to the wireless local area network.

4. A method for authenticating a mobile station for access to a wireless local area network, the method comprising:
   receiving a registration for a mobile station prior to receiving an association request from the mobile station;
   storing identification information for a plurality of mobile stations that are to be allowed to associate to the wireless local area network so as to create a white list of authorized mobile stations;
   storing the white list locally on the wireless local area network;
   associating a mobile station that has roamed into a coverage area of the wireless local area network to the wireless local area network;
   comparing identification information of the mobile station to the white list and when a match occurs, communicating a passphrase for the mobile station to the mobile station via the wireless local area network; and
   receiving from the mobile station the passphrase and using the passphrase to complete connection to the wireless local area network.

5. A method for authenticating a mobile station for access to a wireless local area network, the method comprising:
   roaming a mobile station into a coverage area of a wireless local area network that has received a registration for the mobile station;
   associating the mobile station to the wireless local area network;
   the mobile station communicating to a mobile base station of a cellular telephone network that the mobile station has successfully associated to the wireless LAN;
   the mobile station receiving a passphrase from a cellular telephone network controller after the cellular network controller has matched the mobile station to an entry on a white list; and
   the mobile station using the passphrase to complete connection to the wireless local area network.

6. A method for authenticating a mobile station for access to a wireless local area network, the method comprising:

roaming a mobile station into a coverage area of a wireless local area network that has received a registration for the mobile station;

associating the mobile station to the wireless local area network;

the mobile station communicating to a mobile base station of a cellular telephone network that the mobile station has successfully associated to the wireless local area network; the mobile station receiving a passphrase from the wireless local area network after the wireless local area network has received instructions from a cellular network controller to communicate the passphrase to the mobile station; and the mobile station using the passphrase to completes connection to the wireless local area network.

7. A method for authenticating a mobile station for access to a wireless local area network, the method comprising:

roaming a mobile station into a coverage area of a wireless local area network that has received a registration for the mobile station;

associating the mobile station to the wireless local area network;

the mobile station communicating to a mobile base station of a cellular telephone network that the mobile station has successfully associated to the wireless local area network;

the mobile station receiving a passphrase via the cellular telephone network after a device of the wireless local area network has matched the mobile station to an entry on a white list and communicated the passphrase to the cellular network; and the mobile station using the passphrase to complete connection to the wireless local area network.

8. A method for authenticating a mobile station for access to a wireless local area network, the method comprising:

roaming a mobile station into a coverage area of a wireless local area network that has received a registration for the mobile station;

associating the mobile station to the wireless local area network;

the mobile station communicating to a mobile base station of a cellular telephone network that the mobile station has successfully associated to the wireless local area network;

the mobile station receiving a passphrase from the wireless local area network after a device of the wireless local area network has matched the mobile station to an entry on a white list; and the mobile station using the passphrase to completes connection to the wireless local area network.

9. An access point comprising:

a memory;

a control circuit configured to facilitate storage of a list of dual mode mobile station identifications and a corresponding passphrase for each mobile station identification in the memory;

a circuit configured to facilitate:

storing identification information for a plurality of mobile stations that are to be allowed to associate to the wireless local area network so as to create a white list of authorized mobile stations;

communicating the white list and corresponding passphrases to a network controller of a cellular telephone network;

associating a mobile station that has roamed into a coverage area of the wireless local area network to the wireless local area network; and receiving from the mobile station a passphrase and using the passphrase to complete connection to the wireless local area network, the passphrase having been communicated from a cellular network controller to the mobile station.

10. The access point as recited in claim 9, wherein the control circuit is further configured to permit association of a mobile station having an identification stored in the memory when the mobile station provides the corresponding passphrase.

11. The access point as recited in claim 9, wherein the access point is an IEEE 802.11 compatible access point.

12. The access point as recited in claim 9, further comprising a circuit configured to facilitate the establishment of wireless security parameters to be used in communication between the access point and a mobile station.

13. The access point as recited in claim 9, wherein the access point is configured to communicate with a wide area network.

14. The access point as recited in claim 9, wherein the access point is configured to communicate with the Internet.

15. An access point comprising:

a memory;

a control circuit configured to facilitate storage of a list of dual mode mobile station identifications and a corresponding passphrase for each mobile station identification in the memory;

a circuit configured to facilitate:

storing identification information for a plurality of mobile stations that are to be allowed to associate to the wireless local area network so as to create a white list of authorized mobile stations;

communicating the white list to a network controller of a cellular network and not communicating corresponding passphrases to the network controller;

associating a mobile station that has roamed into a coverage area of the wireless local area network to the wireless local area network;

receiving instructions form a cellular network controller to communicate a passphrase for the mobile station from the wireless local area network to the mobile station;

communicating the passphrase from the wireless local area network to the mobile station via the wireless local area network; and receiving from the mobile station the passphrase and using the passphrase to complete connection to the wireless local area network.

16. An access point comprising: a memory;

a control circuit configured to facilitate storage of a list of dual mode mobile station identifications and a corresponding passphrase for each mobile station identification in the memory;

a circuit configured to facilitate:

storing identification information for a plurality of mobile stations that are to be allowed to associate to the wireless local area network so as to create a white list of authorized mobile stations;

storing the white list locally on the wireless local area network;

associating a mobile station that has roamed into a coverage area of the wireless local area network to the wireless local area network;

comparing identification information of the mobile station to the white list and when a match occurs, communicating a passphrase from the wireless local area network to the mobile station via the cellular telephone network; and receiving from the mobile station the passphrase and using the passphrase to complete connection to the wireless local area network.

17. An access point comprising:

a memory;

a control circuit configured to facilitate storage of a list of dual mode mobile station identifications and a corresponding passphrase for each mobile station identification in the memory;

a circuit configured to facilitate:

storing identification information for a plurality of mobile stations that are to be allowed to associate to the wireless local area network so as to create a white list of authorized mobile stations;

storing the white list locally on the wireless local area network;

associating a mobile station that has roamed into a coverage area of the wireless local area network to the wireless local area network;

comparing identification information of the mobile station to the white list and when a match occurs, communicating a passphrase for the mobile station to the mobile station via the wireless local area network; and receiving from the mobile station the passphrase and using the passphrase to complete connection to the wireless local area network.

* * * * *